United States Patent [19]

Fox

[11] Patent Number: 4,471,842

[45] Date of Patent: Sep. 18, 1984

[54] HAND TOOL HAVING BLADE AND TWO PORTION HANDLE SECURED TOGETHER BY THREADED BOLT

[76] Inventor: William O. Fox, 1500 Oakcliff Rd., Fort Worth, Tex. 76103

[21] Appl. No.: 460,128

[22] Filed: Jan. 24, 1983

[51] Int. Cl.³ .............................................. A01B 1/22
[52] U.S. Cl. ................................. 172/377; 16/114 R; 403/343
[58] Field of Search ...................... 172/375, 376, 377; 16/114 R; 294/57; 403/343, 296, 299; D8/11

[56] References Cited

U.S. PATENT DOCUMENTS 998,744  7/1911  Bonin ............................ 403/343 X
1,628,897  5/1927  Mills .................................. 16/114

FOREIGN PATENT DOCUMENTS 18372  7/1935  Australia ............................ 172/375
666192  2/1952  United Kingdom ................ 172/376

Primary Examiner—Richard T. Stouffer
Attorney, Agent, or Firm—Wm. T. Wofford; James C. Fails; Arthur F. Zobal

[57] ABSTRACT

A hand tool of the type having a closed loop blade. The two ends of the blade overlap each other and are spot welded together. A rectangular shaped hole is formed through the base of the blade. The handle of the tool is formed of two members. The forward member of the handle has a hole formed therethrough with the forward end of the hole being rectangular in shape. The rear end of the handle has a threaded hole formed into the forward end thereof. A carriage bolt is used to secure the two members of the handle together and the blade to the forward member of the handle such that the blade cannot turn relative to the handle.

4 Claims, 4 Drawing Figures

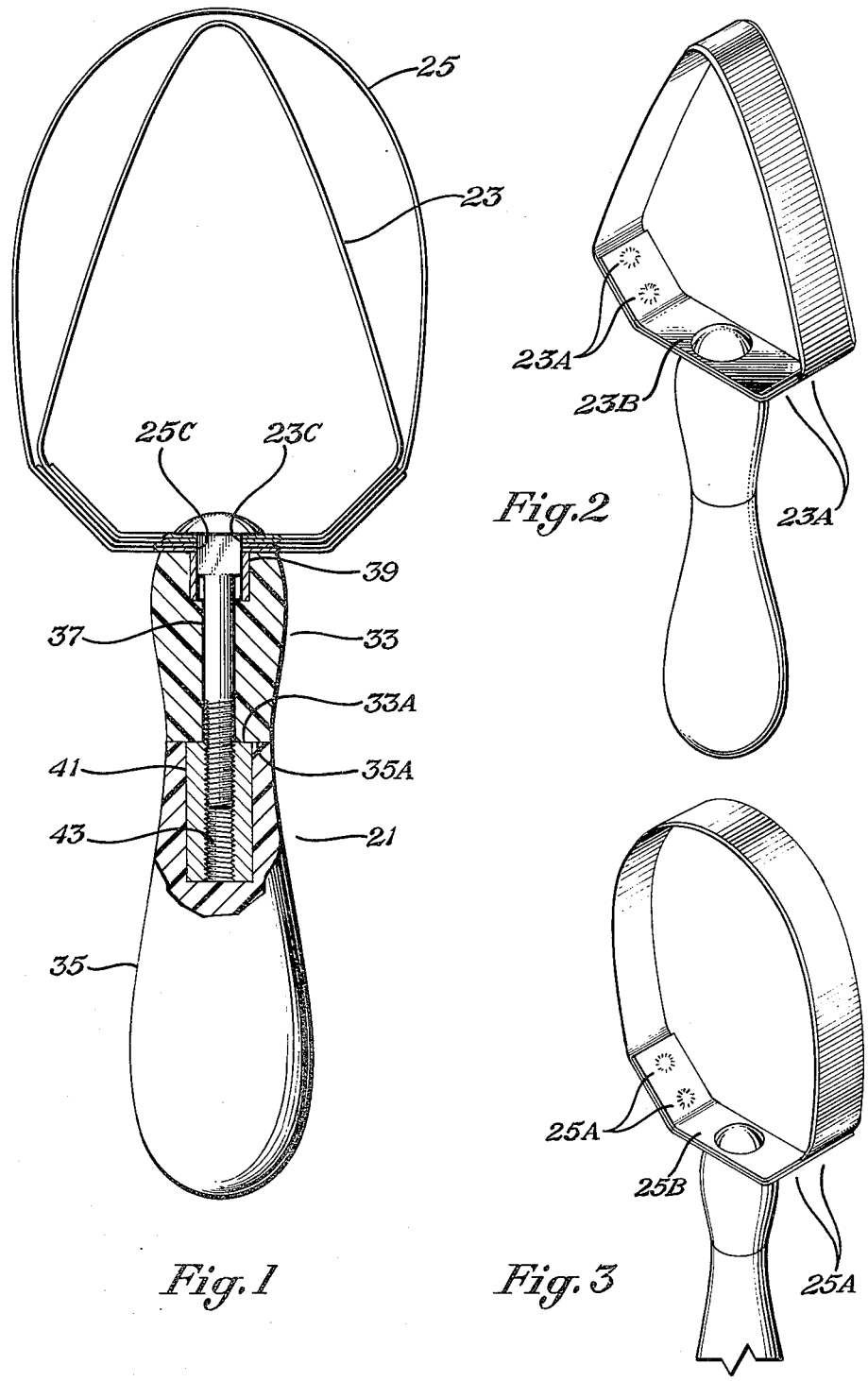

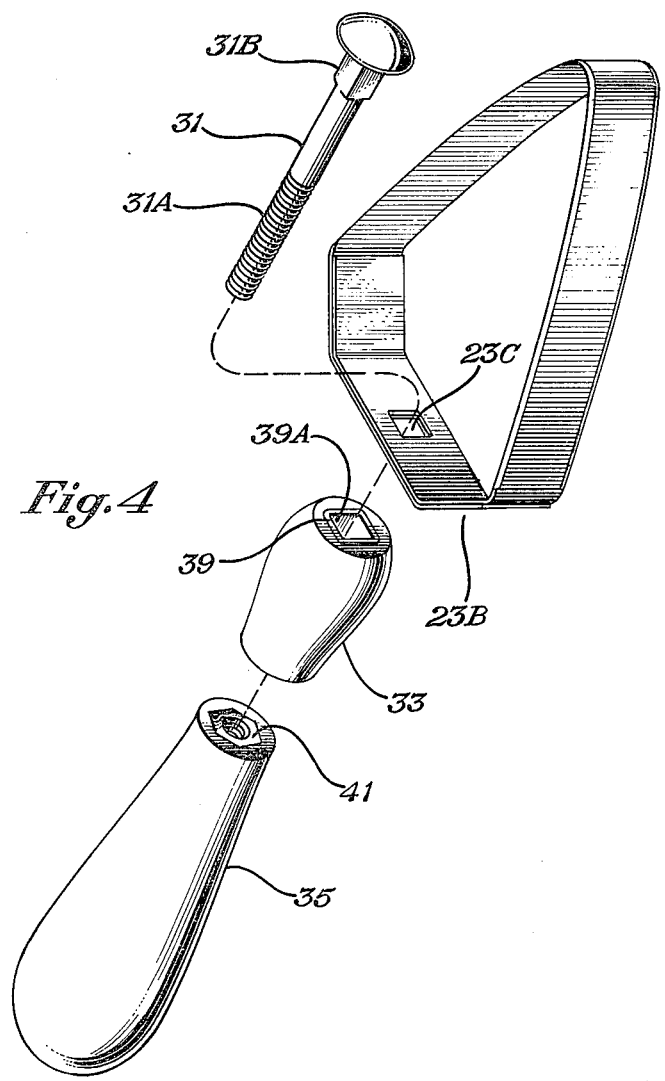

HAND TOOL HAVING BLADE AND TWO PORTION HANDLE SECURED TOGETHER BY THREADED BOLT

BACKGROUND OF THE INVENTION

Description of the Prior Art

In an earlier hand tool which I manufactured for weeding purposes, etc., a closed loop blade is coupled to the end of a one piece handle by a bolt and a lock washer. This coupling arrangement has disadvantages since the blade can turn relative to the handle. The blade is formed of a thin piece of metal with its ends silver soldered to a thicker base member, the latter of which has a round hole formed therethrough for receiving the bolt employed for coupling the blade to the handle. This blade has manufacturing problems.

Summary of the Invention

It is an object of the present invention to provide an improved hand tool of the type having a closed loop blade. The handle of the tool is formed of a forward member and a rear member. A carriage bolt is used to secure the two members of the handle together and the blade to the forward member of the handle such that the blade cannot turn relative to the handle.

The blade is formed of a thin member with its two ends overlapping each other and spot welded together.

BRIEF DESCRIPTION OF THE DRAWINGS

FIG. 1 is a plan view of the hand tool of the present invention with the handle shown in a partial cross-section and with two blades shown attached to the handle.

FIG. 2 illustrates the hand tool of FIG. 1 with the triangular shaped blade attached to the handle.

FIG. 3 illustrates the hand tool of FIG. 1 with the rounded blade attached to the handle.

FIG. 4 is an exploded view of the hand tool of the present invention.

DESCRIPTION OF THE PREFERRED EMBODIMENT

Referring to the drawings, the hand tool of the present invention comprises a handle 21 for supporting either of blades 23 or 25. The hand tool may be used as a hoe, weed cutter, edger, cultivator, mulcher, paint scraper, etc. Generally only one blade at a time will be used depending upon the job to be done. Both blades may be attached to the handle for storage purposes as shown in FIG. 1. Each of the blades is formed of a thin metal member bent in the form shown with its ends overlapping each other and spot welded together. The overlapping portions of blade 23 are spot welded together at 23A and the overlapping portions of blade 25 are spot welded together at 25A. Between the spot welds of each of blades 23 and 25 is a base portion 23B, 25B with a square hole or aperture formed therethrough for receiving a carriage bolt 31 formed of metal. In FIGS. 1 and 4, the square aperture formed through the base portion 23B of blade 23 is shown at 23C. In FIG. 1, the square aperture formed through the base portion 25B of blade 25 is shown at 25C. Manufacture of the blades 23 and 25 is relatively simple.

The carriage bolt 31 has a threaded end 31A and an enlarged portion 31B at its head end. The enlarged portion 31B is square in cross-section and fits snugly in the square apertures formed through the base portions of blades 23 and 25 such that the blades 23 and 25 cannot turn relative to the carriage bolt 31.

The handle 21 is formed of two members 33 and 35. Member 33 has an aperture 37 formed therethrough for receiving the shank of the bolt 31. A metal member 39 is located at the forward end of the member 33. Member 39 has a hole 39A, square in cross-section, formed therethrough in alignment with the aperture 37 for snugly receiving the enlarged portion 31B of the bolt 31 such that the bolt 31 cannot turn relative to the member 33. Member 35 has a metal insert 41 located therein and which has a threaded aperture 43 formed therethrough for receiving the threaded end 31A of the bolt 31. In attaching either of the blades 23 or 25 to the handle, the bolt 31 is inserted through the aperture 23C or 25C of the base of the blade and through the aperture 37 of the handle member 33 such that the enlarged portion 31B of the bolt is located in the aperture 23C or 25C in the hole 39A of member 39. The bolt 31 is then screwed into the threaded aperture 43 of member 41 to secure the members 33 and 35 together and the blade to the forward end of the member 33. When the members 33 and 35 are secured together, their ends 33A and 35A engage and abut each other as shown in FIG. 1. With this arrangement, the bolt 37 cannot turn relative to the member 33 and the blade cannot turn relative to the bolt 31.

In one embodiment, the members 33 and 35 are formed of a suitable plastic material with the members 39 and 41 molded in place in the members 33 and 35.

I claim:

1. A hand tool, comprising:

a handle, a blade means having a structural portion adapted to engage a forward end of said handle for attachment thereto, bolt means having a head end and a threaded end, said structural portion of said blade means having an aperture formed therethrough for receiving said bolt means, said handle comprising a forward portion and a rear portion having a rear and a forward end respectively adapted to engage each other in a given relationship, an aperture formed through said forward portion of said handle from its forward end to its rear end for receiving said bolt means, a threaded aperture formed into said rear portion of said handle from its forward end for receiving the threaded end of said bolt means, said aperture formed through said forward portion of said handle and said aperture formed into said rear portion of said handle being in alignment when said rear and forward ends of said forward and rear portions of said handle engage each other in said given relationship whereby said bolt means may be inserted through said aperture of said structural portion of said blade means, through said aperture formed through said forward portion of said handle and screwed into said threaded aperture formed into said rear portion of said handle to secure said blade means to said forward end of said forward portion of said handle and to secure said forward and rear portions of said handle together, said bolt means at its head end having an enlarged portion with a given non-round shape, said aperture formed through said structural portion of said blade means and the forward portion of said aperture formed through the forward portion of said handle having said given non-round shape for receiving said enlarged portion of said bolt means in a mating relationship to prevent said bolt means from turning relative to said forward portion of said handle and to prevent said blade means from turning relative to said bolt means.

2. The hand tool of claim 1, wherein:

said structural portion of said blade means through which said aperture is formed is relatively thin.

3. The hand tool of claim 1, wherein:

said forward portion of said handle and said rear portion of said handle are formed of plastic material, said forward portion of said handle having a metal member embedded therein, said metal member having an aperture formed therethrough, said aperture of said metal member having said given non-round shape for receiving said enlarged portion of said bolt means, said rear portion of said handle at its forward end having a tubular metal member embedded therein, said tubular metal member having an aperture formed therethrough with internal threads defining said threaded aperture formed into said rear portion of said handle.

4. The hand tool of claim 3, wherein:

said forward portion of said handle is molded from said plastic material with said metal member of said forward portion of said handle embedded in said forward portion of said handle during the molding process, said rear portion of said handle is molded from said plastic material with said tubular metal member embedded in said rear portion of said handle during the molding process.

* * * * *